No. 783,868. PATENTED FEB. 28, 1905.
J. S. JARRATT.
METHOD OF DRYING LUMBER.
APPLICATION FILED NOV. 18, 1904.
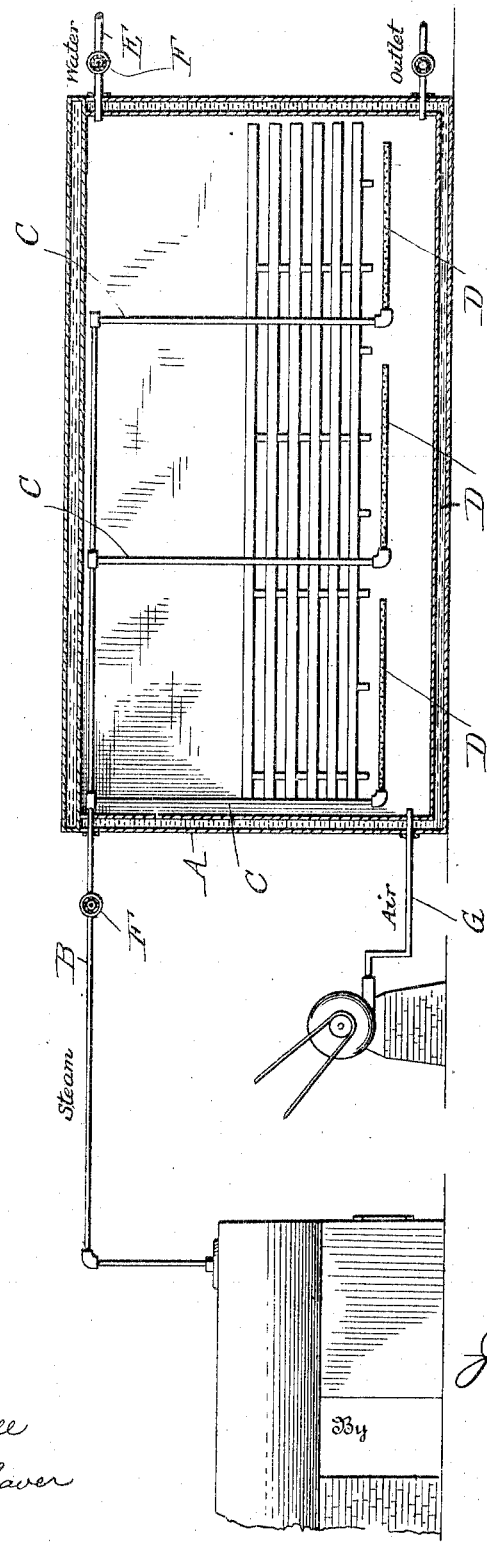
Witnesses
Edwin L. Yewell
G. M. Copenhaver
Inventor
James S. Jarratt
By R. W. Bishop,
Attorney.

No. 783,868.                                              Patented February 28, 1905.

UNITED STATES PATENT OFFICE.

JAMES S. JARRATT, OF SAVANNAH, GEORGIA.

METHOD OF DRYING LUMBER.

SPECIFICATION forming part of Letters Patent No. 783,868, dated February 28, 1905.

Application filed November 18, 1904. Serial No. 233,292.

*To all whom it may concern:*

Be it known that I, JAMES S. JARRATT, a citizen of the United States of America, residing at Savannah, in the county of Chatham and State of Georgia, have invented certain new and useful Improvements in Methods of Drying Lumber, of which the following is such a full, clear, and exact description as will enable others skilled in the art to which it appertains to make and use the same, reference being had to the accompanying drawing, forming a part hereof.

This invention is an improved method of drying lumber; and it consists in certain novel features hereinafter first fully described and then particularly pointed out in the claims.

In drying lumber the great desideratum is to dry the same thoroughly throughout without causing a cracking or checking of the lumber owing to the outside drying while the inside remains comparatively green or moist. Various methods of drying have been tried heretofore in an effort to remove all the sap from the lumber before the outside is dried; but so far as I am aware none has proved satisfactory. In my process the lumber is treated with steam, boiling water, and hot air in such manner that all the sap is removed from the lumber and the drying of the same is effected without any cracking or checking of the surface.

In the accompanying drawing I have shown a sectional view of an apparatus specially adapted for the operation of my process.

In the drawing, A designates a tank constructed of wood or other inexpensive material having a water-chamber on all sides to guard against the scorching or burning of the inner wall of the tank when the hot blast is being operated.

B designates a steam-pipe leading from a boiler, the exhaust of the steam-engine, or other source of supply, and entering the tank near the top of the same. Within the tank the steam-pipe is formed into or provided with a series of branches C, which extend down to within about six inches of the floor of the tank and there communicate with perforated pipes or nozzles D, which permit the steam to escape into the tank.

E designates a water-pipe leading from any source of supply and entering the tank near the top of the same, the steam and water pipes being provided with suitable valves F to facilitate the control of the flow through the same, as will be readily understood.

A tube or pipe G leads from fan or blower and enters the bottom of the tank. The fan or blower will communicate with the furnace of the steam plant, so that when operated it will drive a blast of hot air into the tank; but the blower and the steam plant have not been illustrated, as they may be of the usual construction and a detailed representation of the same is not necessary to a complete understanding of my invention.

In practicing my process the lumber is piled within the tank above the perforated ends or nozzles of the steam-pipes with strips between the several layers or rows of lumber, so that the drying medium may circulate freely around all sides of each piece of lumber. The tank is constructed with steam and water tight joints, and after the lumber has been piled therein a steam and water tight cover is placed thereon, so as to completely close the tank. The valve in the steam-pipe is then opened, so that steam will enter the tank and escape against the lumber, so as to open the pores thereof and penetrate the same. When the steam has opened the pores of the lumber, I turn on the water, which will escape from the water-pipe within the tank and meet the hot steam therein, with the result that the water is violently agitated and driven into the pores of the lumber at the same time that it is boiled by the steam. The boiling water and condensed steam will be forced into the lumber so as to penetrate the depth of the same and dissolve and force therefrom all the sap, gum, and other deleterious foreign matter. After the lumber has been treated with this boiling water a sufficient period of time to entirely remove all the sap and gums the flow of water is cut off and the water discharged through a suitable escape in one side of the tank about one inch above the floor of the same. When the body of water has been discharged, I connect the steam-pipe with the live-steam space of the boiler, so as to admit to the tank steam as hot and dry as possible. This live steam will penetrate the lumber and drive therefrom the water left therein to a very great degree. A slight quantity of moisture, however, will remain even after this hot dry steam acts on the lumber, as the steam will tend to condense thereon and by reaction hold some of the water therein. I therefore start the fan or blower shortly after admitting the live hot steam to the tank, so as to drive a hot-air blast into the tank against the lumber. This hot-air blast causes an evaporation of the steam and moisture and the laden blast may escape through the water-discharge. Shortly after the blast is started the steam is cut off and the blast allowed to play on the lumber until the surface of the lumber begins to get quite dry, when the steam is again turned on and permitted to condense against the surface of the lumber to prevent the cracking or checking of the same. As soon as the steam has moistened the surface of the lumber I again cut it off and permit the blast to again play thereon alone. This alternate supplying and cutting off of the steam may be continued until the hot-air blast has removed all the moisture from the inside of the lumber, the repeated moistening of the surface of the lumber preventing the outside of the lumber being thoroughly dried while the interior is still moist. After the moisture has been thus removed from the lumber it is removed from the tank.

In the processes heretofore employed for drying lumber the outside would be completely dried, while the inside would be left moist and containing gum. The result was that the outside would contract and cause a cracking and consequent spoiling of the lumber. My process keeps the surface moist until the inside is dry and leaves the lumber solid and in good condition for the market. The hot-air blast passes over a shallow quantity of water in the bottom of the tank and absorbs just enough of the moisture to obviate the too rapid drying of the surface of the lumber under the influence of the blast.

Having thus described my invention, what I claim, and desire to secure by Letters Patent, is—

1. The method of drying lumber which consists in subjecting the lumber to a steaming action, then admitting water to the lumber while continuing the steaming action, and then driving the moisture from the lumber.

2. The method of drying lumber which consists in boiling the lumber, then driving the water from the lumber by the action of steam, and then submitting the lumber to a hot-air blast.

3. The method of drying lumber which consists in boiling the lumber and then submitting the lumber alternately to the action of live steam and a hot-air blast repeatedly.

4. The method of drying lumber which consists in submitting the lumber to the action of steam within a closed tank, then admitting water to the tank while continuing the admission of steam, then discharging the water, and then submitting the lumber alternately to the action of steam and a hot-air blast.

5. The method of drying lumber which consists in steaming the lumber, then supplying water to the lumber while continuing the steaming action whereby the lumber is boiled, then admitting dry steam to the lumber to drive off the water, then cutting off the dry steam, then admitting an air-blast to the lumber, then discontinuing the air-blast and again admitting steam, and then discontinuing the admission of steam and again admitting the air-blast.

In testimony whereof I have signed this specification in the presence of two subscribing witnesses.

JAMES S. JARRATT.

Witnesses:
E. F. HARTFELDER,
C. WESTHEIM.